United States Patent

Tordella

[11] 4,078,678
[45] Mar. 14, 1978

[54] VAN PLATFORM HOUSING

[76] Inventor: Joseph R. Tordella, 128 B Elm Dr., Medford, N.J. 08055

[21] Appl. No.: 731,145

[22] Filed: Oct. 12, 1976

[51] Int. Cl.² .............................................. B60P 1/00
[52] U.S. Cl. ........................................ 214/85; 14/69.5
[58] Field of Search ............... 214/83.24, 85; 14/69.5, 14/71.1, 72.5

[56] References Cited

U.S. PATENT DOCUMENTS

| | | | |
|---|---|---|---|
| 3,711,882 | 1/1973 | Iller | 214/85 X |
| 3,730,361 | 5/1973 | Haynes | 214/85 |
| 3,870,170 | 3/1975 | Noble et al. | 214/85 |

Primary Examiner—Robert G. Sheridan
Attorney, Agent, or Firm—Caesar, Rivise, Bernstein & Cohen, Ltd.

[57] ABSTRACT

A van platform housing for installation upon a first floor, such as in a van or a truck; the housing including a special floor to be positioned in spaced relationship to a first floor to define a space, a ramp which is held in the space but adapted to be moved out of the space to an extended, inclined, ramp functioning position, rollers secured to the ramp to facilitate movement of the ramp to and from the extended position, upwardly inclined edges located within the space between the floors, the inclined edges including indents for reception of the rollers as the ramp reaches a desired extended position with the outer edge of the ramp being so placed that ramp inclines downwardly and outwardly.

4 Claims, 7 Drawing Figures

VAN PLATFORM HOUSING

This invention relates to a van ramp housing and more particularly to a new and improved device of this general class.

In the transportation of heavy equipment from place to place, it becomes necessary to move such equipment to and from the transportation van or other vehicle. In common practice a board is utilized as a ramp, but the use of such board is crude and not necessarily reliable since it may become separated from the vehicle. Also, there are storage problems when the board is not in use.

It has been proposed in U.S. Pat. No. 1,717,303 and U.S. Pat. No. 1,884,513 to provide various forms of ramps which are slidable in and out on tracks suspended beneath the floor of a vehicle. Such ramps tend to be complicated and expensive and are not suitable for use over long periods of time with heavy equipment. To the same effect is the ramp of U.S. Pat. No. 1,898,679 which utilizes channel irons with rear ends being curved to form hooks. Such a construction is complicated and therefore expensive. Also, U.S. Pat. Nos. 3,730,361 and 3,768,673 provide collapsable structures which tend to be complicated and therefore expensive.

In view of the foregoing, it is an objective of the present invention to provide a van platform housing which is relatively simple in construction;

Yet another object of the present invention is to provide a van platform housing that can be easily mounted within a van, a truck or other vehicle;

Still another object of the present invention is to provide a van platform housing which presents a special floor that is positioned over the actual floor of the vehicle, but in close proximity thereto so as not to use up valuable space.

Still another object of the present invention is to provide a van platform housing that can be easily and quickly utilized and yet be moved as quickly to a storage position.

The foregoing as well as other objects of the invention are achieved by providing a van platform housing for installation upon a first floor, such as in a van or a truck, with the housing including a special floor that is positioned in spaced relationship to the first floor to define a space therebetween. A ramp is held in the space, but the ramp is adapted to be moved out of the space from a storage position to an extended, inclined, ramp functioning position. The ramp is fitted with rollers to facilitate movement of the ramp to and from the extended position. Upwardly inclined edges are located within the space between the floor with such edges including indents for reception of the rollers as the ramp reaches a desired extended position with the outer edge of the ramp being so placed that the ramp inclines downwardly and outwardly.

Other objects and many of the attendant advantages will be more readily understood by reference to the following figures of the drawing wherein.

Figure 1:
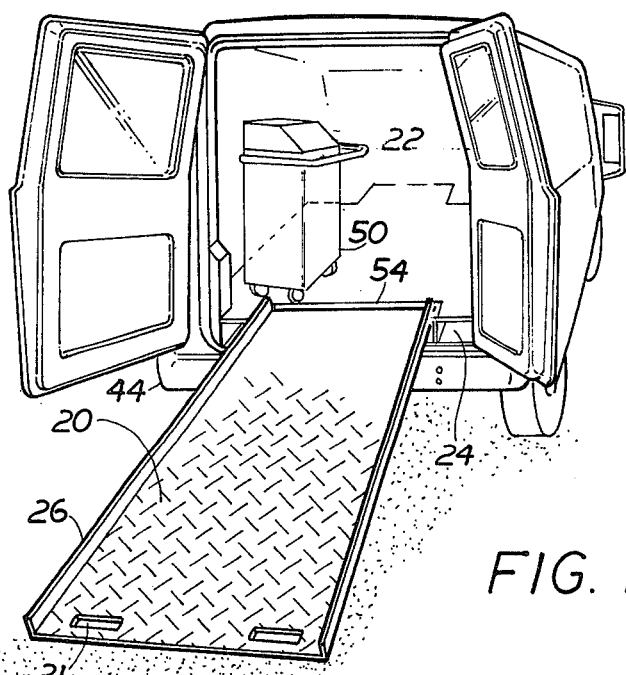
FIG. 1 is a perspective view of the rear end of a van, showing an embodiment of the present invention wherein the ramp has been brought to the extended, inclined ramp functioning position.

Referring now in greater detail to the various figures of the drawing wherein like reference characters refer to like parts there is shown generally at 20 a ramp which constitutes a part of the van platform housing of the present invention. The ramp is shown as being made of a diamond plate aluminum, although the ramp itself may be smooth or roughened in other ways. Moreover, the ramp may be made from other metals such as sheet metal.

Figure 7:
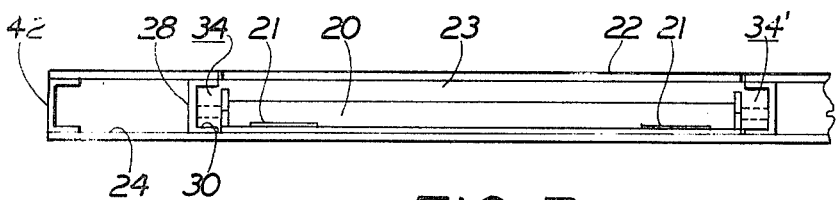
FIG. 7 is an end view of the invention, taken as indicated in FIG. 2.
Figure 3:
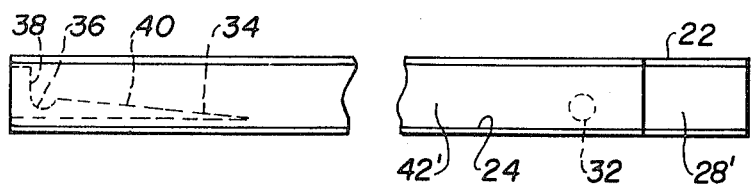
FIG. 3 is an elevational view of the van platform housing of the present invention in the position of FIG. 2.

The ramp 20 possesses hand hold openings 21 to facilitate the movement of the ramp 20 from the storage to the extended positions or vice versa. As shown in FIG. 7 the ramp 20 is maintained in a space 23 between the lower floor 24 of the housing (sometimes referred to as the first floor) and the special or upper floor of the housing 22 which may also be regarded as a false floor. In actual practice the thickness of the entire housing is only 3½ inches and so the false floor does not occupy a significant amount of payload space. As seen in FIG. 1 the ramp 20 also includes upstanding edges 26 for guidance in moving the machinery up and down the ramp.

Figure 6:
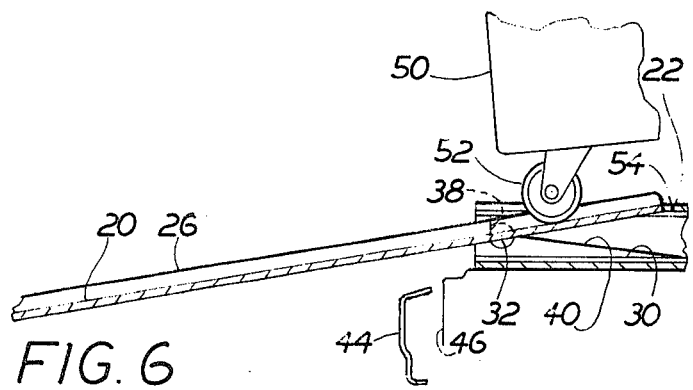
FIG. 6 is a view similar to FIG. 5 wherein the ramp has been brought to its expanded position and wherein a piece of machinery is about to be wheeled from the van and down the ramp.

The floors 22 and 24 are generally of the width of the van and may be spaced from each other by means of channels 28 in the construction as shown in FIG. 7. Thus, the van platform housing can be presented as a single package (thickness of 3½ inches) comprising upper and lower floors 22 and 24 which are received on the existing floor of the van or truck. In such a package the channel members 28 and 42 serve to secure the entire assembly together by spot welding or other techniques. However, as seen in FIGS. 6 the upper floor 22 (special floor) and the lower floor 24 define a space therebetween. The special floor 22 extends outwardly for somewhat less than the longitudinal extent of the first or lower floor 24. As can be further seen in FIG. 6 the special floor terminates outwardly in an outer edge.

Figure 2:
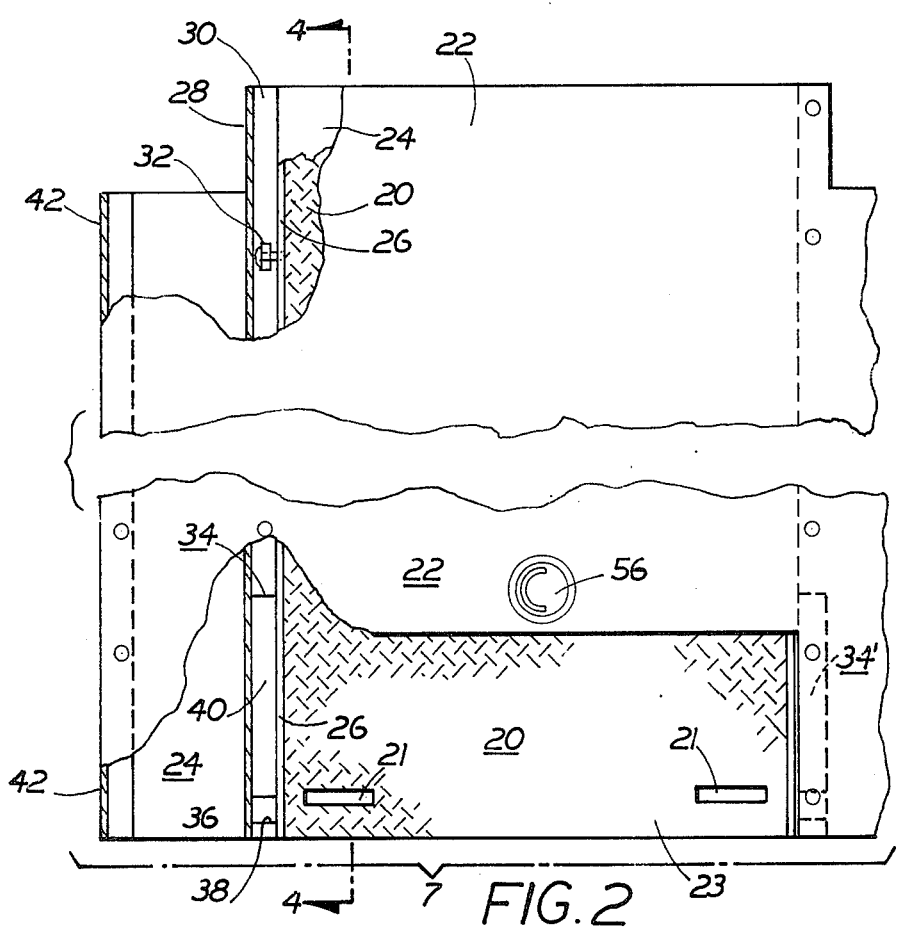
FIG. 2 is an enlarged, fragmentary plan view showing the van platform housing of the present invention in the storage position, with portions broken away from the sake of clarity.

As shown in FIG. 2 rollers 32 are revolvably secured to the ramp 20 with the rollers 32 moving in space 30 which lies between the channels 28 and the ledges 26 of the ramp. Also provided in the space 30 are upwardly inclined edges 34 as shown in FIGS. 3 to 6. The edges 34 possess indents 36 near their high point for reception of the rollers 32 (FIG. 5) although in some instances the indents 36 can be dispensed with. However, where the indents 36 are used, such indents possess a back edge 38 as a part of the inclined plane 40.

Figure 4:
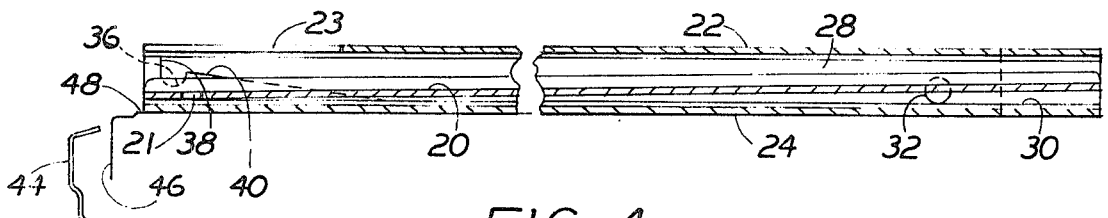
FIG. 4 is a sectional view taken along the lines 4—4 of FIG. 2.
Figure 5:
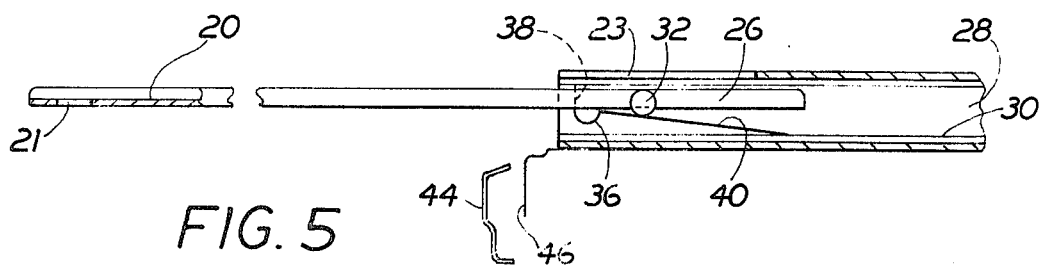
FIG. 5 is a view similar to FIG. 4, but wherein the ramp has been brought from the storage position and almost to its extended position.

Referring again to FIG. 2 it will be seen that channel 42 defines the inside of a truck and in FIG. 1 the truck bumper 44 is shown. Reference is made to FIG. 5 which also shows the truck bumper 44 as well as the truck body 46. The rear tip of the truck floor 48 is indicated in FIG. 4. As can be seen in FIG. 6 the ramp 20 has an outer edge which engages the ground (FIG. 1) and an inner edge that is in close relationship to the outer edge of the special floor to provide a smooth transition from the ramp 20 to the special floor 22 without having to change the thickness of the ramp or the special floor in order to provide the smooth transition.

The use of the present invention is illustrated wherein machinery 50 possessing wheels 52, by way of example only, is wheeled up or down the ramp 20. Clearly, any type of transport aide, such as a pallet or dolly, may be used. Moreover, when the machinery 50 is wheeled into the truck or van, there is essentially no drop or bump as the ramp 20 extends upwardly and meets the upper surface of floor 22 in a good mating relationship so that the path is smooth and there is no jostling of the machinery. For this reason there are times when the indents 36 can be dispensed with since the ramp 20 (FIG. 6) mates perfectly with floor 22. However, the movement of rollers 32 on the inclined plane 40 achieves the tilting of ramp 20 (FIG. 6) irrespective of indents 36 to obtain the abutment of the rear edge of ramp 20 against floor 22 as shown in FIG. 6.

While the present invention has been illustrated in connection with a van, it is clear that the invention can be used in connection with vehicles as well as stationary installations such as a dock. In some instances the inclined plane may be dispensed with and other locking mechanisms, such as pins or springs utilized. For this reason, the inclined plane will be broadly referred to as tilting means. Moreover, in fabricating the van platform housing of this invention, sheet metal may be used which is formed into supports such that there is a resulting one piece floor and space for the wheels, thereby eliminating separate pieces such as channels 28 or channels 42.

In certain instances it will be desirable to secure auxiliary means such as the tie down rings 56 (FIG. 2) or rollers (not shown) to facilitate the movement of ramp 20 to and from its positions. Also, tracks (not shown) can be mounted on floor 22 to facilitate movement to and from the ramp 20 and the interior of the van or to hold the machinery during transporation.

The platform housing can be readily installed in the van or truck by means of bolts passing through floors 20 and 24 between channels 28 and 42 as illustrated by the two bolts shown in the left hand portion of FIG. 2.

It should now be clear that the present invention can have wide use, not only with vehicles but with the movement of drawers in desks and filing cabinets. The present invention also includes having the indents 36 act as an adjustable fulcrum and indeed several slots can be provided along the inclined plane 40 to achieve various extensions of the ramp 20, although the preferred extension will be where there is abutment between the ramp 20 and floor 22 as shown.

Without further elaboration the foregoing will so fully illustrate my invention that others may, by applying current or future knowledge, readily adapt the same for use under various conditions of service.

What is claimed as the invention is:

1. A van platform housing comprising a first lower floor, the housing also including a special floor positioned in spaced relationship above the first floor to define a space therebetween, said special floor extending outwardly for somewhat less than the longitudinal extent of said first floor with said special floor terminating outwardly in an outer edge, a ramp located in said space and having an outer edge and an inner edge, an inclined plane means positioned in said space below said ramp and above said first floor, said inclined plane means being positioned generally outwardly of the outer edge of said special floor, said inclined plane means having an indent and being inclined upwardly and outwardly, said ramp being adapted to be moved out of said space from a storage position to an extended, inclined ramp functioning position, rollers secured to the ramp and engaging said inclined plane means to facilitate movement of the ramp to and from the extended position, at least one of said rollers being received in said indent when said ramp is brought to the extended position wherein said ramp is inclined downwardly and outwardly with said ramp outer edge contacting a lower surface, and said ramp inner edge being in close relationship to the outer edge of said special floor to provide a smooth transition from said ramp to said special floor without changing the thickness of said ramp and said special floor.

2. The van platform of claim 1 wherein said first floor is a part of said housing and is secured to said special floor.

3. The van platform of claim 1 wherein the inner edge of the ramp abuts against said special floor.

4. The van platform of claim 1 wherein the housing is secured against the floor of a van so that said first, lower floor of the van housing lies upon the floor of the van.

* * * * *